2,809,119
COATING COMPOSITION

David K. Lesser, Wilmington, Del., assignor to Hercules Powder Company, Wilmington, Del., a corporation of Delaware No Drawing. Application June 28, 1954, Serial No. 439,899

7 Claims. (Cl. 106—170)

This invention relates to coating compositions and more particularly to a suspension-type coating composition.

A suspension-type coating composition is more specifically defined as a special case of an emulsion where, usually, the particle size is over 100 microns. Rather recently, this type coating composition has become quite popular. This is due to the fact that the coating composition can be prepared using a single coating material pigmented in different colors or shades. Upon single application of the composition, unusual finishes and effects are obtained, such as multicolor finishes in which the different colors or shades of the particles remain distinguishable after the coating composition has hardened upon a surface. Generally, these compositions have been prepared by forming separate dispersions of relatively large particles of differently colored coating materials in aqueous dispersing mediums containing a stabilizing agent and mixing said separate dispersions with mild agitation. From an availability and economic point of view, methyl cellulose has been rather widely used as the stabilizing agent. However, it has been found that most solutions of film formers will not form suspensions in methyl cellulose solutions. Accordingly, very limited combinations of inner phase film formers and outer phase stabilizers are available for producing suspension-type coating compositions acceptable for commercial usage.

Now, in accordance with this invention, it has been found that the deficiencies prevalent in prior art coating compositions of the suspension-type may be overcome by providing an improved coating composition comprising a dispersion of discrete particles of coating material in an aqueous dispersing medium containing a suspension stabilizer in which said dispersion of discrete particles contains a small amount of nitrocellulose sufficient to materially increase the stability of the coating composition. These improved coating compositions may be produced in a methyl cellulose solution with any film former miscible or partially miscible with nitrocellulose alone or with any film former miscible with nitrocellulose in combination with other modifiers, such as resins and/or plasticizers. Furthermore, the compositions may be prepared with the discrete particles being based on two or more film formers in the same aqueous dispersing medium. Still further, the compositions of this invention may be prepared to provide very unusual patterns and effects in the dried film which are pleasingly distinctive from those obtained using prior art compositions.

Examples of the invention are presented herein for the purpose of illustration but it will, of course, be understood that the invention is susceptible to different modified embodiments which come within the scope of the appended claims. In the following examples, all parts and percentages given are by weight.

EXAMPLE 1

A film-forming lacquer as the inner phase was prepared in accordance with the following formula:

Lacquer phase: Parts
Polyvinyl chloride-acetate resin (Vinyl chloride 87 and vinyl acetate 13%)[1] _____ 20.0
China clay _____ 5.0
Toluene _____ 37.5
Methyl isobutyl ketone _____ 37.5
Viscosity, 353 cp.

[1] Intrinsic viscosity 0.53 in cyclohexanone at 20° C.

An aqueous dispersing medium as the outer phase was also prepared having the following formula:

Aqueous phase: Parts
Tap water _____ 99.5
Methyl cellulose, 4000 cp. _____ 0.5

To demonstrate the effect that nitrocellulose has on the composition, RS nitrocellulose ½ sec. (dry) based on the total weight of the lacquer phase was added thereto as follows:

| Percent Nitrocellulose (By Weight) | Particle Size in mm.[1] | Particle Shape |
|---|---|---|
| 0.0 | Emulsion | Spheres. |
| 1.0 | 0.05–0.25 | Do. |
| 2.5 | 0.1–0.75 | Do. |
| 4.0 | 0.5–1.5 | Spherical with some elongated. |
| 5.0 | 0.5–3 | Elongated. |

[1] Two parts of lacquer phase is added to 1 part of aqueous phase and agitated vigorously for about 1 minute.

EXAMPLE 2

A film-forming lacquer as the inner phase was prepared in accordance with the following formula:

Lacquer phase: Parts
Ethyl cellulose (N–10)[1] _____ 20.0
China clay _____ 5.0
Toluene _____ 55.0
Methyl isobutyl ketone _____ 10.0
Ethyl alcohol _____ 10.0
Viscosity, 1800 cp.

[1] N denotes an ethoxyl content of 46.8 to 48.5% and the number following denotes viscosity in cps. as determined in 80/toluene/alcohol in 5% concentration solution.

An aqueous dispersing medium as the outer phase was also prepared having the following formula:

Aqueous phase: Parts
Tap water _____ 99.5
Methyl cellulose, 400 cp _____ 0.5

To demonstrate the effect that nitrocellulose has on the composition, SS nitrocellulose ½ sec. (dry) based on the total weight of the lacquer phase was added thereto as follows:

| Percent Nitrocellulose (By Weight) | Particle Size in mm.[1] | Particle Shape |
|---|---|---|
| 0.0 | Emulsion | |
| 1.0 | do | |
| 2.5 | 0.5–1.5 | Spheres to elliptical. |
| 5.0 | 1.0–3.0 | Large elongated. |

[1] Two parts of lacquer phase is added to 1 part of aqueous phase and agitated vigorously for about 1 minute.

With reference to Examples 1 and 2, it will be seen that the percentage of nitrocellulose which is necessary to produce stable suspensions varies with the type of film former in the inner phase and the viscosity of the inner phase. Additionally, it will be seen that in the presence of sufficient nitrocellulose the suspension is improved in respect to stability to withstand vigorous agitation and that special effects can be obtained as a particle shape may be produced which is spherical, elliptical or elongated or a combination of these.

EXAMPLE 3

A film-forming lacquer as the inner phase was prepared using the following formula in which various grades of ethyl cellulose were used:

| Lacquer phase: | Parts |
| --- | --- |
| Ethyl cellulose | 20.0 |
| SS nitrocellulose, ½ sec | 2.5 |
| China clay | 5.0 |
| Xylene | 52.5 |
| Methyl isobutyl ketone | 10.0 |
| Butyl alcohol | 10.0 |

Two parts of lacquer phase of the above formula was added to one part of an aqueous phase of the same type used in Example 2 and was agitated vigorously for about one minute. The effect of viscosity on the suspensions formed by using various grades of ethyl cellulose in the above formula is given in the following table:

*Table A*

| Grade Ethyl Cellulose | Viscosity of Lacquer in Poises | Particle Size in Suspension in mm. | Particle Shape |
| --- | --- | --- | --- |
| N-7 [1] | 11.2 | Emulsion | Spherical. |
| N-14 | 36.0 | 0.25-0.5 | Elliptical. |
| N-22 | 150.0 | 0.01-0.8 | Do. |
| N-50 | 760.0 | 0.5-3.0 | Elongated to elliptical. |
| N-100 | 1,200.0 | 0.3-5.0 | Elongated. |
| N-200 | 2,000.0 | 0.5-10.0 | Do. |

[1] N denotes an ethoxyl content of 46.8 to 48.5% and the number following denotes viscosity in cps. as determined in 80/toluene/alcohol in 5% concentration solution.

With reference to Example 3, it will be seen and has been found in general that the higher the viscosity of the inner phase the particles become larger and more elongated, and the suspension becomes more stable. Here again, very novel effects can be obtained with the elliptical and elongated particle shapes while attaining suspensions of a high degree of stability.

EXAMPLE 4

A film-forming lacquer phase and an aqueous phase were prepared using the following formula:

| Lacquer phase: | Parts |
| --- | --- |
| SS nitrocellulose, 5-6 sec. (dry) | 4.0 |
| Ethyl hydroxyethyl cellulose (D. S. oxyethyl 0.3-0.9 and total ethoxy 2.6-2.9) [1] | 10.0 |
| Glycerol ester of rosin (Ester gum) [2] | 10.0 |
| TiO₂ | 5.0 |
| China clay | 5.0 |
| Ethyl acetate | 12.0 |
| Xylene | 32.0 |
| Butanol | 22.0 |
| Aqueous phase: | |
| Methyl cellulose, 4000 cp | 0.5 |
| Tap water | 99.5 |

[1] Viscosity, low 20-50 cp. 5% solution in 80:20 toluene:ethanol by weight at 25° C.
[2] Viscosity, B Gardner-Holdt, 60% solution in mineral spirits.

Two parts of lacquer phase of the above formula was added to one part of the aqueous phase and mixed in a mechanical agitator operating at about 100 R. P. M. until discrete particles were formed giving a stable suspension. When this procedure was repeated in the absence of nitrocellulose in the above formula, a suspension was not obtained.

EXAMPLE 5

To demonstrate the unusual patterns and effects obtainable in accordance with this invention, two lacquer phases and an aqueous phase were prepared using the following formula:

| Lacquer phase A: | Parts |
| --- | --- |
| TiO₂ | 8.8 |
| RS Nitrocellulose, 5-6 sec. (dry) | 2.4 |
| Modified ester of rosin (Cellolyn 102) [1] | 6.0 |
| Chlorinated rubber, 1000 cp | 16.0 |
| Raw castor oil | 6.9 |
| Ethyl acetate | 18.0 |
| Xylene | 42.0 |
| Lacquer phase B: | |
| Chrome green | 6.0 |
| RS nitrocellulose, 5-6 sec. (dry) | 16.0 |
| Raw castor oil | 6.8 |
| Ethyl acetate | 18.0 |
| Xylene | 42.0 |
| Aqueous phase: | |
| Methyl cellulose, 4000 cp | 0.5 |
| Tap water | 99.5 |

[1] Viscosity, K Gardner-Holdt, 60% solution in toluene at 25° C.

A suspension of the above formula was prepared by agitating 100 parts of the aqueous phase at about 100 R. P. M. with 175 parts of lacquer phase B and 25 parts of lacquer phase A. The lacquer phases were added before agitation. The agitation was continued until elongated cigar-shaped particles were formed. This suspension was sprayed with a conventional spray gun and the pattern formed was quite novel and pleasing with a series of white threads against a green background.

EXAMPLE 6

To demonstrate the preparation of a multicolored coating composition based on chlorinated rubber which has good flame resistance properties, the following formula was prepared:

| Lacquer phase A: | Parts |
| --- | --- |
| TiO₂ | 10.0 |
| Chlorinated rubber, 20 cp | 20.0 |
| RS nitrocellulose, 5-6 sec. (dry) | 3.0 |
| Chlorinated biphenyl (Aroclor 1254) | 10.0 |
| Ethyl acetate | 15.0 |
| Xylene | 42.0 |
| Lacquer phase B: | |
| Same as Example 5 but chrome green was substituted for the TiO₂. | |
| Aqueous phase: | |
| Methyl cellulose, 4000 cp | 0.5 |
| Tap water | 99.5 |

A suspension of the above formula was prepared by agitating 100 parts of the aqueous phase at about 100 R. P. M. and slowly adding 100 parts of lacquer phase A and then adding 100 parts of lacquer phase B. The agitation was continued until the suspension was formed. The coating composition thus formed when sprayed and dried on a substrate had a pleasing multicolor effect and did not support combustion.

With reference to stability, the improvement in stability by incorporation of a small amount of nitrocellulose in accordance with this invention is most readily accomplished when the concentrations and viscosity grade of the suspension stabilizer are held within certain ranges. For example, using methyl cellulose as representative of a preferred material for this purpose, the following table shows the concentration limits of the various grades of methyl cellulose which should be used to obtain stable lacquer suspensions.

Table B

| Viscosity Grade of Methyl Cellulose | 10 cp. | 25 cp. | 400 cp. | 4,000 cp. |
|---|---|---|---|---|
| Minimum percent in water phase | 0.4 | 0.3 | 0.1 | 0.1 |
| Viscosity in cp | 3.5 | 3.0 | 3.0 | 4.0 |
| To— | | | | |
| Maximum percent in water phase | 1.5 | 3.0 | 1.0 | 0.75 |
| Viscosity in cp | 45 | 75 | 200 | 200 |

Generally, the stabilizer selected for the outer phase and the amount thereof will depend upon the nature of the solvents in the coating composition as well as the coating material itself. However, water-soluble cellulose ethers are preferred as the stabilizing agent and include methyl cellulose, ethyl cellulose, methyl ethyl cellulose and like materials which tend to lower the interfacial tension of aqueous solutions. Although these materials may be used in different viscosities and combinations thereof, a concentration from about 0.1 to about 3.0% based on the weight of the outer phase with a viscosity from about 10 to about 5000 cps. as determined in the outer phase has been found satisfactory.

The coating materials which may be used in accordance with this invention include organosoluble materials that are at least partially miscible with nitrocellulose. Such materials include cellulose derivatives, other than nitrocellulose, of course, such as ethyl cellulose, cellulose acetate, ethyl hydroxyethyl cellulose; epoxy-type compounds such as the reaction or condensation products of an epihalohydrin with a polyhydric phenol; chlorinated-type compounds such as chlorinated rubber; alkyl resins, vinyl chloride copolymers, drying oils, amino resins, phenolic resins, and the like. Although these materials may be used in different viscosities and combinations thereof, a concentration from about 5 to about 50% based on the weight of the inner phase with from about 1 to about 10% nitrocellulose incorporated therein has been found to yield satisfactory results. Various suitable solvent or latent solvent systems well known in the art may be employed with these coating materials and such systems should be selected so as to dissolve the particular type of nitrocellulose used. Generally, a ratio of inner phase to outer phase in the order of 2:1 parts will be satisfactory but this may be varied from about 6:1 to about 1:6 parts by weight. The nitrocellulose found suitable in accordance with this invention includes all conventional "soluble" types.

The improved suspension-type coating compositions of this invention have many advantages in that they are possessed of improved stability, may be easily prepared, may contain two or more film formers in the same aqueous dispersing medium, may provide unusual patterns and effects in contrast to coating compositions containing only globules as discrete particles, may be prepared to provide good flame-resistant properties, and may be prepared to possess other special properties and advantages as will be apparent to those skilled in the art.

What I claim and desire to protect by Letters Patent is:

1. As a new composition of matter, an improved coating composition consisting essentially of a lacquer-in-water dispersion of visibly discrete colored lacquer particles in an aqueous dispersing medium containing from about 0.1% to about 3% by weight of water-soluble lower alkyl cellulose ether as a suspension stabilizer, said aqueous dispersing medium having a viscosity from about 10 cps. to about 5,000 cps., said colored lacquer consisting essentially of from about 20% to about 50% by weight of organosoluble coating material other than nitrocellulose at least partially miscible with nitrocellulose, a small amount from about 1% to about 10% by weight of nitrocellulose sufficient to materially increase the stability of the coating composition, and volatile organic solvent, said organosoluble coating material and said nitrocellulose being dissolved in said volatile organic solvent, the ratio of said nitrocellulose to said organosoluble coating material being not more than about 5 parts nitrocellulose to about 20 parts of organosoluble coating material.

2. As a new composition of matter, an improved coating composition consisting essentially of a lacquer-in-water dispersion of a mixture of visibly discrete particles of different colored lacquers in an aqueous medium containing from about 0.1% to about 3% by weight of water-soluble lower alkyl cellulose ether as a suspension stabilizer, said aqueous dispersing medium having a viscosity of from about 10 cps. to about 5,000 cps., at least one of said colored lacquers consisting essentially of from about 20% to about 50% by weight of organosoluble coating material other than nitrocellulose at least partially miscible with nitrocellulose, a small amount from about 1% to about 10% by weight of nitrocellulose sufficient to materially increase the stability of the coating composition, and volatile organic solvent, said organosoluble coating material and said nitrocellulose being dissolved in said volatile organic solvent, the ratio of said nitrocellulose to said organosoluble coating material being not more than about 5 parts nitrocellulose to about 20 parts organosoluble coating material.

3. A composition as defined in claim 1 in which the suspension stabilizer in the aqueous medium is methyl cellulose.

4. As a new composition of matter, an improved coating composition consisting essentially of a lacquer-in-water dispersion of visibly discrete colored lacquer particles in an aqueous dispersing medium containing about 0.1% to about 3% by weight of water-soluble lower alkyl cellulose ether as a suspension stabilizer, said aqueous dispersing medium having a viscosity from about 10 cps. to about 5000 cps., said colored lacquer consisting essentially of from about 20% to about 50% by weight of polyvinyl chloride-acetate resin, a small amount from about 1% to about 10% by weight of nitrocellulose sufficient to materially increase the stability of the coating composition, and volatile organic solvent, said polyvinyl chloride-acetate resin and said nitrocellulose being dissolved in said volatile organic solvent, the ratio of said nitrocellulose to said polyvinyl chloride-acetate resin being not more than about 5 parts nitrocellulose to about 20 parts of polyvinyl chloride-acetate resin.

5. As a new composition of matter, an improved coating composition consisting essentially of a lacquer-in-water dispersion of visibly discrete colored lacquer particles in an aqueous dispersing medium containing from about 0.1% to about 3% by weight of water-soluble lower alkyl cellulose ether as a suspension stabilizer, said aqueous dispersing medium having a viscosity from about 10 cps. to about 5000 cps., said colored lacquer consisting essentially of from about 20% to about 50% by weight of ethyl cellulose, a small amount from about 1% to about 10% by weight of nitrocellulose sufficient to materially increase the stability of the coating composition, and volatile organic solvent, said ethyl cellulose and said nitrocellulose being dissolved in said volatile organic solvent, the ratio of said nitrocellulose to said ethyl cellulose being not more than about 5 parts nitrocellulose to about 20 parts of ethyl cellulose.

6. As a new composition of matter, an improved coating composition consisting essentially of a lacquer-in-water dispersion of visibly discrete colored lacquer particles in an aqueous dispersing medium containing from about 0.1% to about 3% by weight of water-soluble lower alkyl cellulose ether as a suspension stabilizer, said aqueous dispersing medium having a viscosity from about 10 cps. to about 5000 cps., said colored lacquer consisting essentially of from about 20% to about 50% by weight of ethyl hydroxyethyl cellulose, a small amount from about 1% to about 10% by weight of nitrocellulose sufficient to materially increase the stability of the coating composition, and volatile organic solvent, said ethyl hydroxyethyl cellulose and said nitrocellulose being dissolved in said volatile organic solvent, the ratio of said nitrocellulose to said ethyl hydroxyethyl cellulose being not more than about 5 parts nitrocellulose to about 20 parts of ethyl hydroxyethyl cellulose.

7. As a new composition of matter, an improved coating composition consisting essentially of a lacquer-in-water dispersion of visibly discrete colored lacquer particles in an aqueous dispersing medium containing from about 0.1% to about 3% by weight of water-soluble lower alkyl cellulose ether as a suspension stabilizer, said aqueous dispersing medium having a viscosity from about 10 cps. to about 5000 cps., said colored lacquer consisting essentially of from about 20% to about 50% by weight of chlorinated rubber, a small amount from about 1% to about 10% by weight of nitrocellulose sufficient to materially increase the stability of the coating composition, and volatile organic solvent, said chlorinated rubber and said nitrocellulose being dissolved in said volatile organic solvent, the ratio of said nitrocellulose to said chlorinated rubber being not more than about 5 parts nitrocellulose to about 20 parts of chlorinated rubber.

References Cited in the file of this patent

UNITED STATES PATENTS

| 2,510,834 | Phillips | June 6, 1950 |
| 2,591,904 | Zola | Apr. 8, 1952 |

FOREIGN PATENTS

| 330,897 | Great Britain | Dec. 7, 1929 |
| 884,147 | France | Aug. 3, 1943 |